United States Patent [19]
Gorby et al.

[11] 3,915,321
[45] Oct. 28, 1975

[54] FRONT END LOADER

[75] Inventors: Oliver L. Gorby; Dennis A. Rice, both of Fargo, N. Dak.

[73] Assignee: Dynamic Industries Inc., Barnesville, Minn.

[22] Filed: May 25, 1972

[21] Appl. No.: 256,677

[52] U.S. Cl. .................... 214/140; 180/44; 403/259
[51] Int. Cl.² ......................................... E02F 3/36
[58] Field of Search ............... 214/140; 180/44, 51; 280/492; 403/259, 260, 261; 74/700, 710

[56] References Cited
UNITED STATES PATENTS

| | | | |
|---|---|---|---|
| 3,049,186 | 8/1962 | Garrett | 180/51 |
| 3,189,117 | 6/1965 | Ammon | 180/51 |
| 3,240,284 | 3/1966 | Finneman | 280/492 |
| 3,521,720 | 7/1970 | Korotkin | 214/140 |
| 3,768,836 | 10/1973 | Walser | 280/492 |

FOREIGN PATENTS OR APPLICATIONS

| | | | |
|---|---|---|---|
| 1,071,661 | 6/1967 | United Kingdom | 180/44 F |

Primary Examiner—Robert J. Spar
Assistant Examiner—Ross Weaver
Attorney, Agent, or Firm—Robert E. Kleve

[57] ABSTRACT

The invention comprises a front end loader. The loader has a front and rear frame with bucket means and means to raise and lower the bucket on the front frame. A rear axle is mounted to the rear frame with rear wheels mounted in the rear axle. A front axle is mounted to the front frame with front wheels mounted to the front axle. A gasoline motor is mounted to the rear frame, which drives a hydraulic pump which drives a hydraulic motor. The hydraulic motor drives the reduction gears of a gear reduction box. The gear reduction box is mounted directly to the front of the rear axle and has an output drive directly connected to the input shaft of the rear axle to drive the rear axle for driving the rear wheels, an universal joint is mounted directly to the output drive of the gear box and drives a telescoping drive shaft which drives a second universal joint. The second universal joint drives the front axle for driving the front wheels.

1 Claim, 5 Drawing Figures

U.S. Patent  Oct. 28, 1975  Sheet 1 of 2  3,915,321
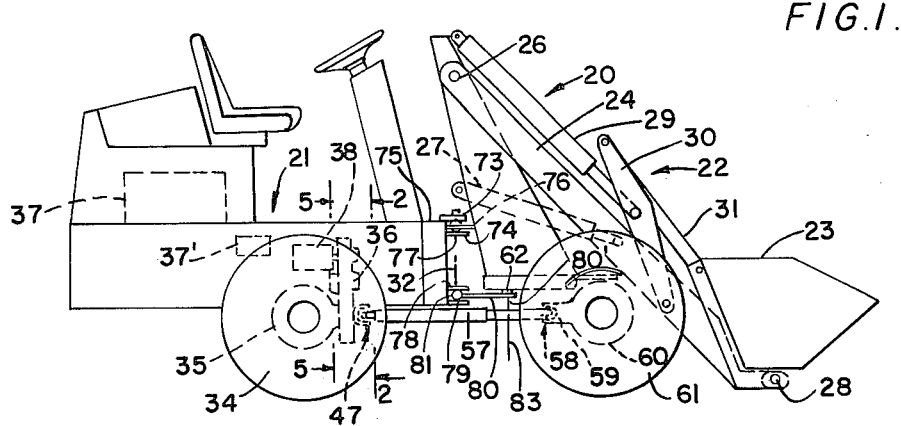
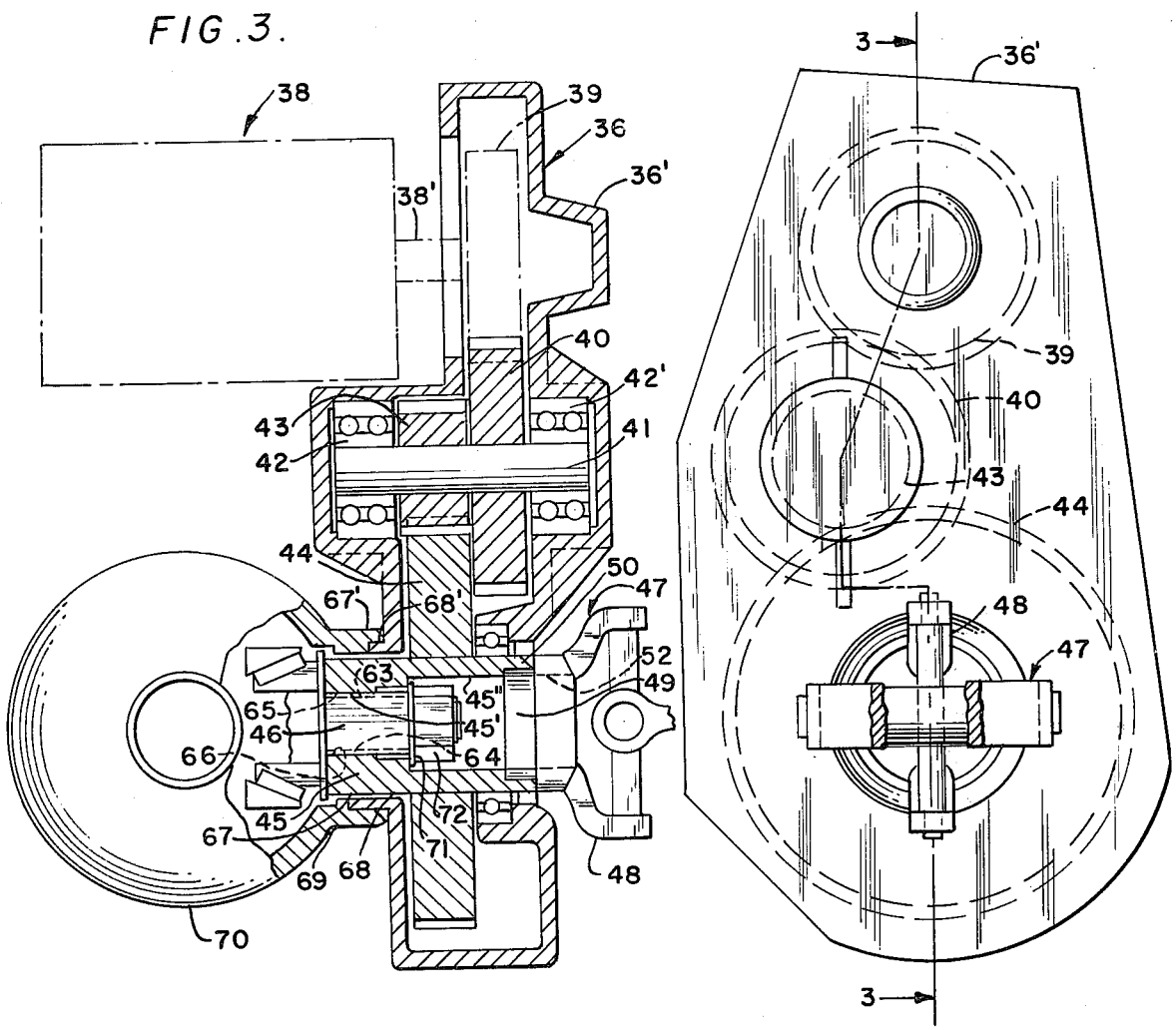

FRONT END LOADER

This invention relates to front end loaders, lifters, and the like.

It is an object of the invention to provide a novel front end loader having a four wheel drive wherein the gear reduction box for the hydraulic motor is mounted directly to the front of the rear axle housing with the universal joint to transmit the drive to the front wheel drive mounted directly in front of the gear reduction box.

It is another object of the invention to provide a novel front end loader having a hydraulic motor for powering the four wheel drive with a compact improved construction for the gear box and rear axle connection for this front end loader.

It is another object of the invention to provide a novel front end loader having a simplified compact construction.

Further objects and advantages of the invention will become apparent as the description proceeds and when taken in conjunction with the accompanying drawings wherein:

FIG. 1 is a side elevational view of the front end loader illustrating the gear box connection to the rear axle and hydraulic motor and connection to the front axle.

FIG. 2 is a cross-sectional view of the gear box taken along line 2—2 of FIG. 1.

FIG. 3 is a cross-sectional view of the gear box and rear axle taken along line 3—3 of FIG. 2 with the hydraulic motor shown in phantom lines.

Figure 4:
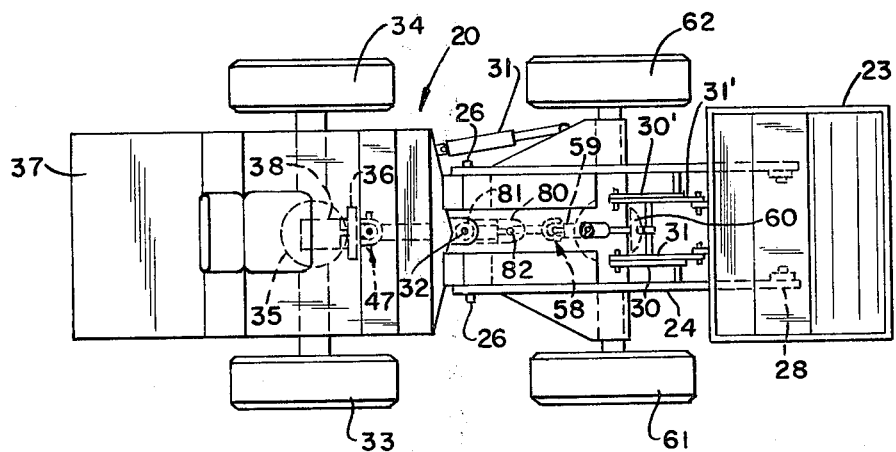
FIG. 4 is a top plan view of the front end loader with portions broken away to reveal the drive connection between the front and rear axle of the front end loader and to reveal the pivotal link connection between the front and rear frames.
Figure 5:
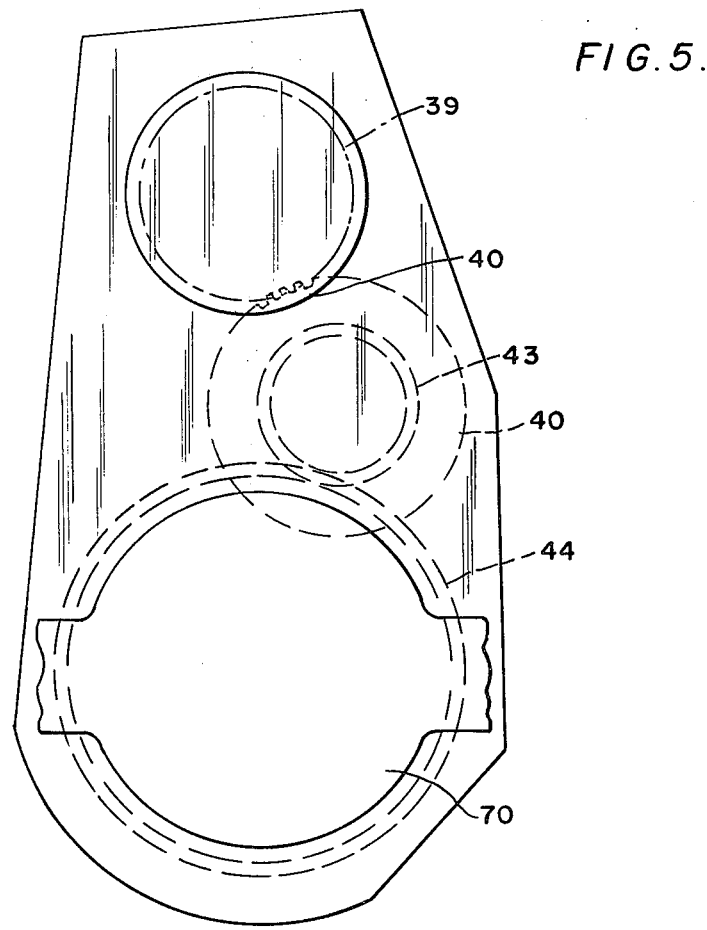
FIG. 5 is an enlarged fragmentary view of the rear axle and gear reduction box taken along line 5—5 of FIG. 1.

Briefly stated, the invention comprises a front end loader having a front and rear frame with a pair of drive wheels on the rear frame and a pair of drive wheels on the front frame. A gear reduction box is mounted to the front of the rear axle from the rear drive wheels and universal joint is mounted directly in front of the gear box. A gasoline motor is mounted to the rear frame, said gasoline motor powers a hydraulic pump and a hydraulic motor. The hydraulic motor is mounted to the top of the gear reduction box and drive the reduction gear of the gear box which in turn drives the rear axle drive which in turn drives the rear wheels. The universal joint directly in front of the gear reduction box transmits drive through a drive shaft to a front universal joint and the front universal joint drives the front axle gearing which in turn drives the front wheels. A pivotal or articulated connection connects the front and rear frames. The pivotal connection has an upper pivotal connection or uniball connection between the front and rear frame and a lower pivotal connection or uniball connection between the rear frame and the rear of an elongated plate. The front of the elongated plate is pivotally mounted to the front frame by a uniball connection at a location spaced forward from the rear pivotal mounting whereby the front and rear frame may oscillate or pivot relative to another about more than one axis to provide an improved suspension and connection between the frames.

Referring more particularly to the drawings in FIG. 1, the front end loader invention 20 is illustrated as having a conventional front and rear frame 21 and 22, with a bucket 23 mounted to the front frame which is raised and lowered by arms 24 and 24' about an axis 26 by a hydraulic cylinder and piston 27 and which bucket is pivoted about a horizontal axis 28 by a hydraulic cylinder and piston 29 and arms 30 and 30' in a conventional manner. A hydraulic cylinder and piston 31 is provided pivotally mounted at its ends between the front and rear frames to pivot the front frame relative to the rear frame about a vertical axis 32.

A pair of rear drive wheels 33 and 34 are connected together by a rear axle 35. A gear reduction box 36 is mounted directly in front of the rear axle 35. A gasoline motor 37 is mounted to the rear frame. A hydraulic pump 37' is fixed to the rear frame and drives a hydraulic motor 38. The hydraulic motor 38 is fixed to the rear frame 21 shown in phantom lines and is also fixed to the gear reduction box housing 36' at the top. The hydraulic motor 38 has an output shaft 38' and a gear 39 is fixed axially to the output shaft 38'. The gasoline motor powers the hydraulic pump which drives the hydraulic motor and the hydraulic motor through its output shaft rotates gear 39. The gear 39 drives the large reduction gear 40 of the gear reduction box 39. The gear 40 is fixed to a cylindrical shaft 41 and the shaft 41 is rotatably mounted in a pair of ball bearing members 42 and 42' mounted in the housing. A small reduction gear 43 is fixed to the shaft 40 and is driven by the rotation of gear 40. The small reduction gear 43 engages and drives gear 44. Gear 44 is fixed annually about sleeve 45. The sleeve 45 mounted onto the conventional input shaft 46 of the conventional rear axle 35 and gear 43 rotates the sleeve 45 and input shaft 46 which drives the rear axle gearing which in turn drives the rear wheels 33 and 34.

A rear universal joint 47 has a yoke 48. The yoke 48 has a reduced cylindrical shoulder portion 49 which is fitted into a cylindrical recess 50 in the sleeve 45. The yoke 48 may be also suitably welded to the sleeve 45. The sleeve 45 at its outer end is rotatably supported in the gear box housing by ball bearing member 51. The yoke has a bore 52 therethrough.

Consequently, the rotation of sleeve 45 rotates the universal joint 47 and the universal joint 47 rotates the conventional splined telescoping drive shaft 51 which drive shaft 55. The shaft at its forward end is connected to a universal joint 58. The universal joint 58 rotates the input shaft 59 of the front axle 60 and drives the front axle gearing and the front axle gearing in turn drives the front wheels 61 and 62.

The input shaft 46 has a plurality of elongated radially opposed slots 63 and 64. To attach the gear box to the rear axle, the sleeve 45 has a plurality of radially projecting tongues 65 and 66 in its bore 45' which are slidably received into the slots 61 and 62 to form a spline connection. The gear box housing 36' has an annular opening 67 with a projecting annular ridge 67' which fits into an annular groove 68' in an annular opening 68 in the forward end 69 of the rear axle housing 70. A washer 71 is slid over the outer end of the shaft 46 and a nut 72 is threaded onto the shaft 46 against the washer 71 within the bore portion 45'' to lock the sleeve 45 axially to the input shaft 46, with the gear box housing 36' directly abutting the axle housing 70. The attachment of the nut 72 acts to retain the gear box housing and output drive to the rear axle housing and input drive.

The gear box 36 may be removed from the rear axle 35 by detaching the gear box 36 from the hydraulic motor and rear frame. Thereafter, the nut 72 will be unthreaded and the washer 71 removed. This enables the sleeve 45 to be slid off the shaft 46 by being slid along the longitudinal axis of the input shaft 46 with the tongues 65 and 66 sliding out of the slots 63 and 64 and with the gear housing ridge 67 sliding out of the annular groove 68 in the rear axle housing 70.

The front and frames are pivotally connected together by a pair of lugs 73 and 74 which are fixed to front 75 of the rear frame and project forwardly and a lug 76 which is fixed to the front frame and projects rearwardly with a uniball connection 77 pivotally connecting lugs 70 and 71 to lug 74 at axis 32.

A second pair of lugs 78 and 79 are fixed to the front 75 of the rear frame directly beneath the lugs 73 and 74. An elongated plate 80 has one end pivotally mounted to the lugs 78 and 79 in a uniball connection 81 on the same axis 32.

The other end of the plate 80 is pivotally mounted to the front frame by a uniball connection 82 at location about a second vertical axis 83.

The three pivotal uniball connections 77 and 81, and 82 provide a pivotal connection between the front and rear frames about more than one axis for a more flexible connection between the front and rear frames.

Thus it will be seen that a front end loader device has been provided with a novel direct gear box having connection and drive connection to the rear axle and rear axle drive for a simplified more positive drive and that a novel plural axes linkage connection between the front and rear frame has also been provided.

It will be obvious that various changes and departures may be made to the invention without departing from the spirit thereof and accordingly, it is not intended that the invention be limited to that specifically described in the specification or as illustrated in the drawings but only as set forth in the appended claims wherein:

What is claimed is:

1. A front end loader device comprising a front frame having a front axle thereon with a pair of drive wheels mounted to the outer ends of said front axle and a rear frame having a rear axle thereon with a pair of drive wheels on the outer ends of said rear axle with an articulated connection between the frames, a gear box mounted to said rear frame directly in front of the rear axle, said gear box having at least three reduction gears mounted therein in a gear train, motor means to power the first of said reduction gears, with the last of said reduction gears providing power at a reduced speed, said front and rear axles having input shafts, with said input shaft of said rear axle projecting forwardly through said last reduction gear, said last reduction gear receiving said input shaft of said rear axle coaxially so that the two rotate together, a first universal joint connected to the front of said last reduction gear in front of said gear box, a telescoping shaft at its one end connected to said first universal joint and at its other end connected to the input shaft of the front axle by a universal joint, whereby powering the motor transmits drive through the reduction gears at a reduced speed, and the last reduction gear transmits drive to the input shaft of the rear axle and through the first universal joint and telescoping drive connection transmits drive to the input shaft of the front axle with the front and rear axles transmitting drive to the front and rear wheels at a reduced speed, said last reduction gear and said rear input shaft having a splined connection so as to be detachable from one another with a threaded nut threaded onto the front end of said input shaft against said last reduction gear from the front of said last reduction gear to detachably mount said last reduction gear and said gearbox to said input shaft and said rear axle solely by said threaded nut said last reduction gear having a hollow sleeve portion coaxially surrounding said threaded nut and said front end of said input shaft in spaced relation and projecting forward with said first mentioned universal joint connected to said sleeve at its forward end.

* * * * *